United States Patent
Shen

(10) Patent No.: US 6,702,376 B1
(45) Date of Patent: Mar. 9, 2004

(54) TILTING ANGLE-ADJUSTABLE BICYCLE SADDLE

(75) Inventor: Giu Shen, Taichung (TW)

(73) Assignee: Selle Tech Industrial Co., Ltd., Taichung Hsien (TW)

( * ) Notice: Subject to any disclaimer, the term of this patent is extended or adjusted under 35 U.S.C. 154(b) by 0 days.

(21) Appl. No.: 10/455,446

(22) Filed: Jun. 6, 2003

(30) Foreign Application Priority Data

Apr. 30, 2003 (TW) ........................................ 92206920 U

(51) Int. Cl.[7] .................................................. B62J 1/00
(52) U.S. Cl. ................................... 297/215.15; 248/371
(58) Field of Search ..................... 297/215.15, 215.13, 297/195.1, 195.11, 313, 311; 248/371, 397, 291.1

(56) References Cited

U.S. PATENT DOCUMENTS

| | | | | |
|---|---|---|---|---|
| 2,931,423 A | * | 4/1960 | Kalter | 297/215.15 |
| 3,066,978 A | * | 12/1962 | Kalter | 297/215.15 |
| 3,302,970 A | * | 2/1967 | Rizzato | 297/215.15 |
| 3,891,333 A | * | 6/1975 | Corderac'k | 297/215.15 X |
| 4,568,121 A | * | 2/1986 | Kashima | 297/215.15 |
| 5,383,706 A | * | 1/1995 | Chen | 297/215.15 |
| 5,466,042 A | * | 11/1995 | Herman | 297/215.15 |
| 5,649,738 A | * | 7/1997 | Thomson et al. | 297/215.15 |
| 5,664,829 A | * | 9/1997 | Thomson et al. | 297/215.15 X |

* cited by examiner

Primary Examiner—Peter M. Cuomo
Assistant Examiner—Rodney B. White
(74) Attorney, Agent, or Firm—Bacon & Thomas, PLLC

(57) ABSTRACT

A tilting angle-adjustable bicycle saddle includes a mounting frame, which is adapted to be affixed to a seat post of a bicycle, having a holder base provided with a smoothly arched bottom wall, an inner shell having a chamber for pivotally accommodating the holder base therein, and two screw bolts. The chamber of the inner shell has two opposite sidewalls pivotally connected to the holder base of the mounting frame at two sides, a smoothly arched bottom wall fitting over the bottom side of the smoothly arched bottom wall of the holder base, a bottom center opening, and two bottom through holes. And, the two screw bolts are respectively inserted through the bottom through holes of the inner shell and respectively screwed up with the holder base of the mounting frame to lock the inner shell in position.

6 Claims, 6 Drawing Sheets

US 6,702,376 B1

TILTING ANGLE-ADJUSTABLE BICYCLE SADDLE

BACKGROUND OF THE INVENTION

1. Field of the Invention

The present invention relates generally to bicycle saddles and, more particularly, to a tilting angle-adjustable bicycle saddle.

2. Description of the Related Art

The saddle of a bicycle has a great concern with the comfort riding of the bicycle. Improving the softness and shock absorbing power of a bicycle saddle relatively improves the comfort of the riding of the bicycle. The relative relationship between the saddle and the whole body of the bicycle (for example, the height of the saddle, the distance between the saddle and the handlebars) may be adjusted subject to the body size or riding posture of the rider. An ideal bicycle saddle has proper softness and good shock absorbing power, and can be conveniently adjusted to fit the rider's riding posture. Most bicycles enable the rider to adjust the elevation of the saddle (some bicycles enable the user to adjust the position of the saddle between a front limit position and a rear limit position). However, few commercially available bicycles allow the rider to adjust the tilting angle of the saddle. Due to this limitation, the rider of a conventional bicycle cannot adjust the saddle to the most comfortable position.

There are limited models of bicycles that allow the rider to adjust the tilting angle of the saddle. However, conventional tilting angle-adjustable saddles are commonly complicated and comprised of a big number of parts. A tilting angle-adjustable saddle is known comprising two clamping blocks respectively pivoted to the top end of the seat post of a bicycle at two sides by a respective pivot, which seat post having two smoothly arched slots around the pivots at the clamping blocks, to form a T-shaped groove between the clamping blocks, a saddle body having a T-block coupled to the T-shaped groove, and two screw bolts respectively mounted the clamping blocks and the smoothly arched slots. When the screw bolts fastened tight, the clamping blocks are affixed to the saddle body. When loosened the screw bolts, the user can than move the saddle body forwards or backwards relative to the clamping blocks and turned the clamping blocks about the respective pivot to the desired angle. When adjusted, the screw bolts are fastened tight again to lock the saddle body.

SUMMARY OF THE INVENTION

It is the main object of the present invention to provide a bicycle saddle, which enables the user to adjust its tilting angle.

It is another object of the present invention to provide a tilting angle-adjustable bicycle saddle, which has a simple structure that is comprised of a less number of parts.

To achieve these objects of the present invention, the tilting angle-adjustable bicycle saddle comprises a mounting frame adapted to be affixed to a seat post of a bicycle having a holder base provided with two opposite sidewalls and an arched bottom wall curved downwards and connected between the sidewalls, an inner shell having a chamber for pivotally accommodating the holder base of the mounting frame therein, and two screw bolts. The chamber of the inner shell has two opposite sidewalls pivotally respectively connected to the two sidewalls of the holder base of the mounting frame for enabling the inner shell to be turned relative to the mounting frame within a predetermined angle, an arched bottom wall connected between the sidewalls of the inner shell and curved downwards and substantially fitting over the arched bottom wall of the holder base of the mounting frame, a center opening in a center of the arched bottom wall of the inner shell, and two through holes in the arched bottom wall of the inner shell near two distal ends of the arched bottom wall of the inner shell. And, the two screw bolts are respectively inserted through the through holes of the inner shell from outside of the inner shell toward inside of the inner shell and respectively screwed up with the holder base of the mounting frame to lock the inner shell in position.

DETAILED DESCRIPTION OF THE INVENTION

Figure 1:
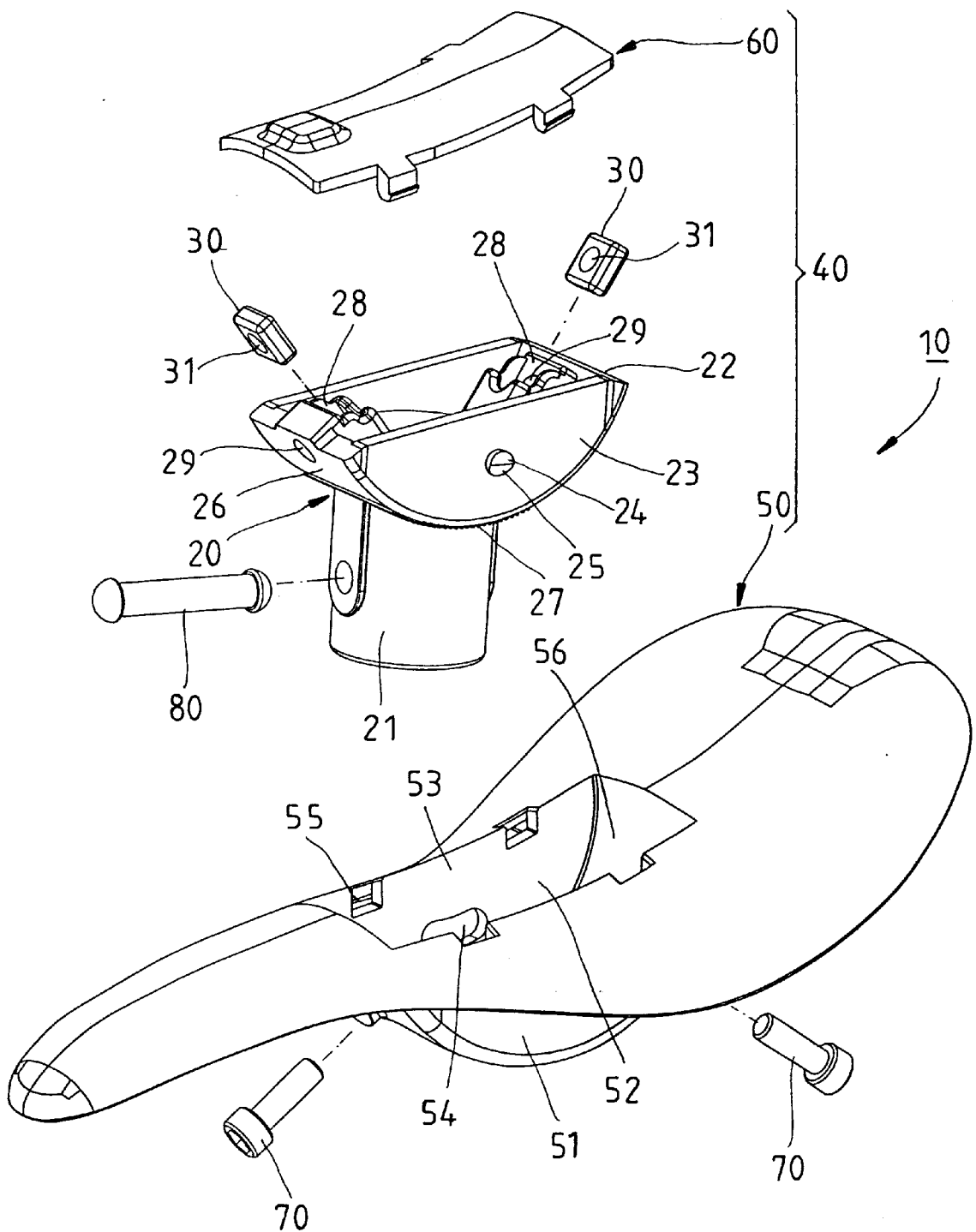
FIG. 1 is an exploded view of a tilting angle-adjustable bicycle saddle according to a preferred embodiment of the present invention.

Referring to FIG. 1, a tilting angle-adjustable bicycle saddle, referenced by 10, is shown comprising a mounting frame 20 for fastening to the top end of the seat post of a bicycle, two nuts 30 mounted inside the mounting frame 20, a saddle body (only the inner shell 40 of the saddle body is shown in the drawing) pivoted to the mounting frame 20, and two screw bolts 70 for locking the saddle body and the mounting frame 20.

Figure 7:
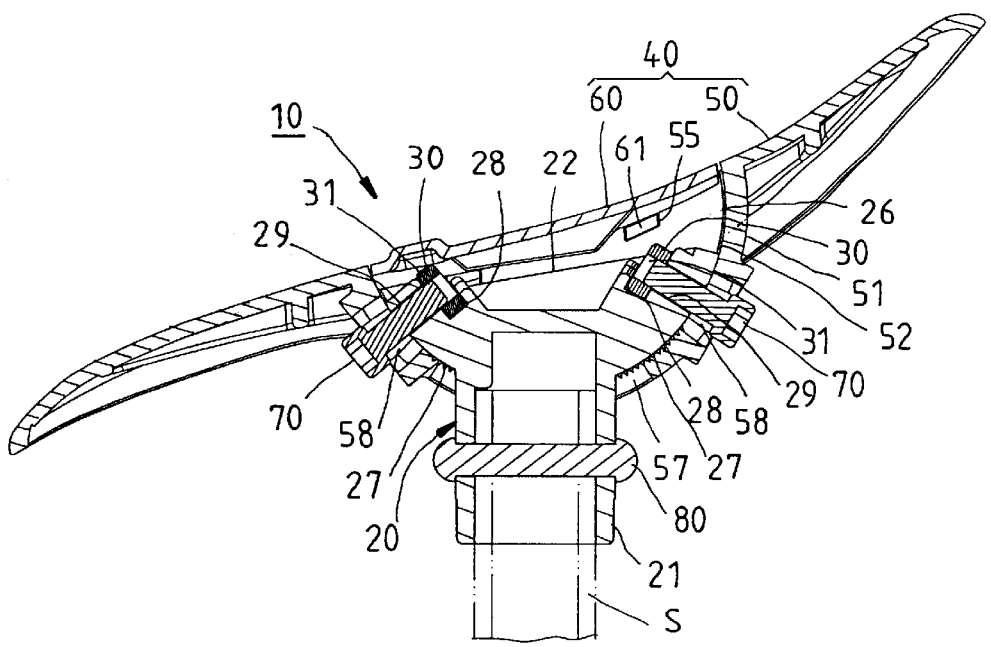
FIG. 7 is a sectional view taken along line 7—7 of FIG. 4.

Referring to FIG. 7 and FIG. 1 again, the mounting frame 20 comprises an upright sleeve 21 and a holder base 22 located on the top end of the upright sleeve 21. The upright sleeve 21 is shaped like a barrel having a bottom open end and a top close end. The inner diameter of the upright sleeve 21 fits the outer diameter of the bicycle's seat post S so that the upright sleeve 21 can be sleeved onto the top end of the seat post S. The holder base 22 has two semicircular flat sidewalls 23 arranged in parallel at two opposite lateral sides with the respective straight peripheral side disposed at the top and the respective smoothly arched peripheral side disposed at the bottom, two pivot rods 24 respectively perpendicularly extended from the center of the outer surface of each of the semicircular flat sidewalls 23, the pivot rods 24 each having a bottom sloping face 25, a smoothly arched bottom wall 26 connected between the semicircular flat sidewalls 23 at the bottom side and curved downwards and formed integral with the top end of the upright sleeve 21, a plurality of transverse teeth 27 formed in the outer surface of the smoothly arched bottom wall 26 around the upright sleeve 21 (see FIG. 5), two rectangular coupling grooves 28 bilaterally located on the inside between the upright sidewalls 23 and sloping obliquely downwardly toward each other, and two through holes 29 respectively extended through the two distal ends of the smoothly arched bottom wall 26 into the rectangular coupling groove 28.

The two nuts 30 are rectangular metal blocks respectively inserted into the rectangular coupling grooves 28 of the mounting frame 20, each having a screw hole 31 extended through the respective front and back sides and respectively axially set into alignment with the through holes 29 of the mounting frame 20.

The aforesaid saddle body further comprises an intermediate layer of foamed material (not shown) bonded to the top side of the inner shell 40, and a fabric or leather cover (not shown) covering the intermediate layer of foamed material. The basic composition of the inner shell, intermediate layer of foamed material and cover of the saddle body is seen in various conventional bicycle saddle designs. Because the intermediate layer of foamed material and the cover are not within the scope of the claims of the invention, they are not shown in the drawings. The main features of the present invention are at the inner shell 40. As illustrated, the inner shell 40 is comprised of an inner shell body 50 and a cap 60. The inner shell body 50 is an elongated member having a relatively narrower front side and a relatively broader rear side (the contour of the inner shell body 50 is substantially similar to a regular bicycle saddle), having a protruding bottom block 51 downwardly suspended on the middle at the bottom side, and a top open chamber 52 formed in the top side corresponding to the protruding bottom block 51. The top open chamber 52 has two upright sidewalls 53 arranged in parallel at two opposite lateral sides, a smoothly arched bottom wall 56 connected between the semicircular sidewalls 53 at the bottom side and curved downwards. The pitch between the semicircular sidewalls 53 is slightly greater than the distance between the two semicircular flat sidewalls 23 of the mounting frame 20. The semicircular sidewalls 53 each have a horizontally extended elongated coupling hole 54 on the middle and two retaining notches 55 near the top. The smoothly arched bottom wall 56 of the inner shell body 50 has a center opening 57 slightly greater than the outer diameter of the upright sleeve 21 of the mounting frame 20, two through holes 58 near two ends, and transverse teeth 59 on the top surface (see FIG. 7). The width of the opening 57 in the longitudinal direction is greater than the width of the opening 57 in the transverse direction.

Figure 3:
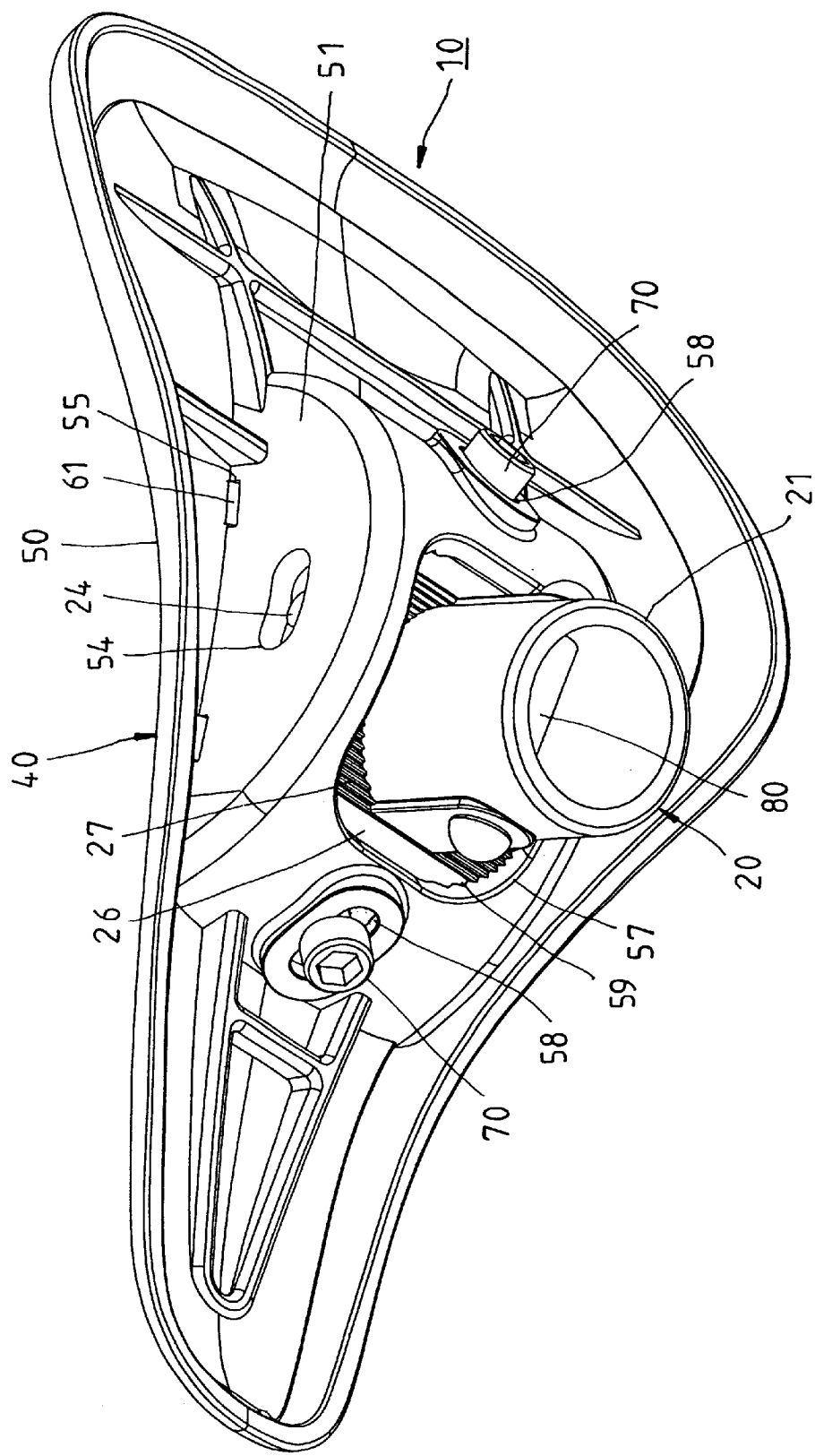
FIG. 3 is anther perspective view of the tilting angle-adjustable bicycle saddle according to the preferred embodiment of the present invention.
Figure 5:
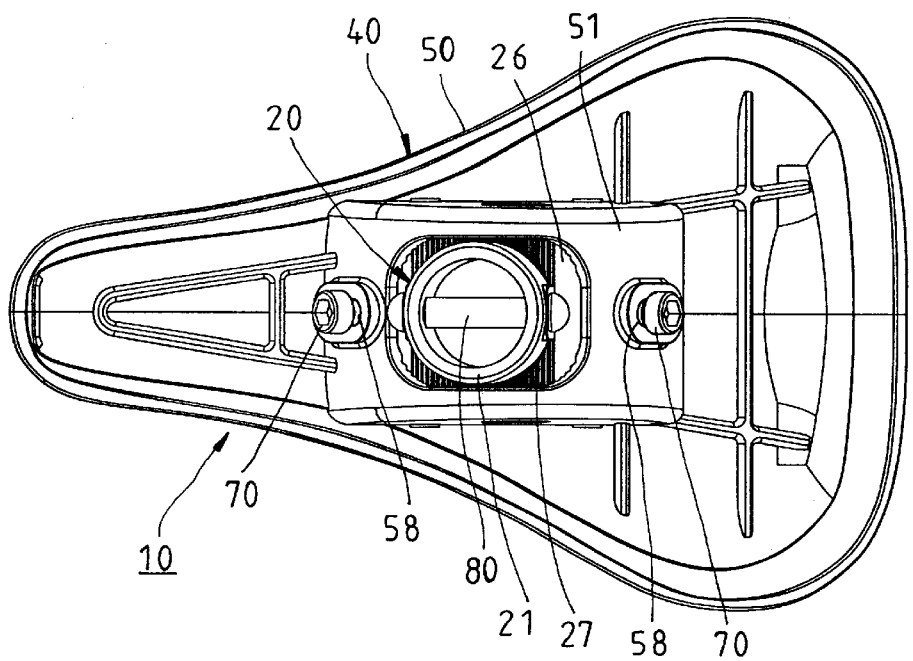
FIG. 5 is a bottom view of the tilting angle-adjustable bicycle saddle according to the preferred embodiment of the present invention.

The inner shell body 50 of the inner shell 40 is pivoted to the top end of the holder base 22 of the mounting frame 20, and can be alternatively biased forwards and backwards. As illustrated in FIGS. 3, 5, and 7, the mounting frame 20 is put in the top open chamber 52 of the inner shell body 50 to let the upright sleeve 21 be extended out of the protruding bottom block 51 through the center opening 57, and then the pivot rods 24 of the holder base 22 are respectively coupled to the elongated coupling holes 54 in the semicircular flat sidewalls 23 of the mounting frame 20, for enabling the inner shell body 50 to be biased relative to the mounting frame 20 within a predetermined angle. When installed, the smoothly arched bottom wall 26 of the holder base 22 is fitted over the smoothly arched bottom wall 56 of the top open chamber 52 (the transverse teeth 27 and 59 are meshed together), and the through holes 29 of the mounting frame 20 are respectively aimed at the through holes 58 of the inner shell body 50.

Figure 2:
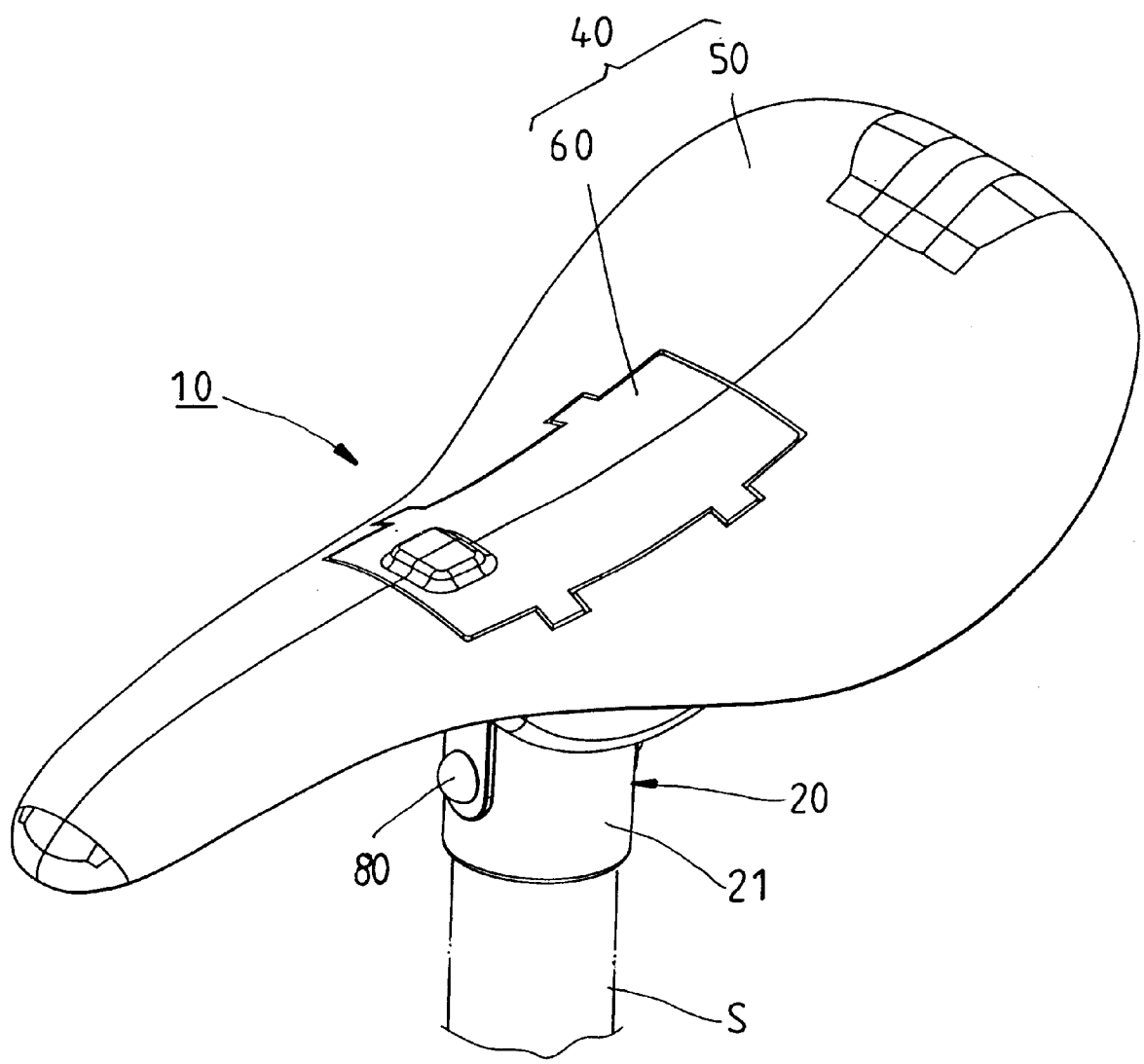
FIG. 2 is a perspective assembly view of tilting angle-adjustable bicycle saddle according to the preferred embodiment of the present invention.
Figure 4:
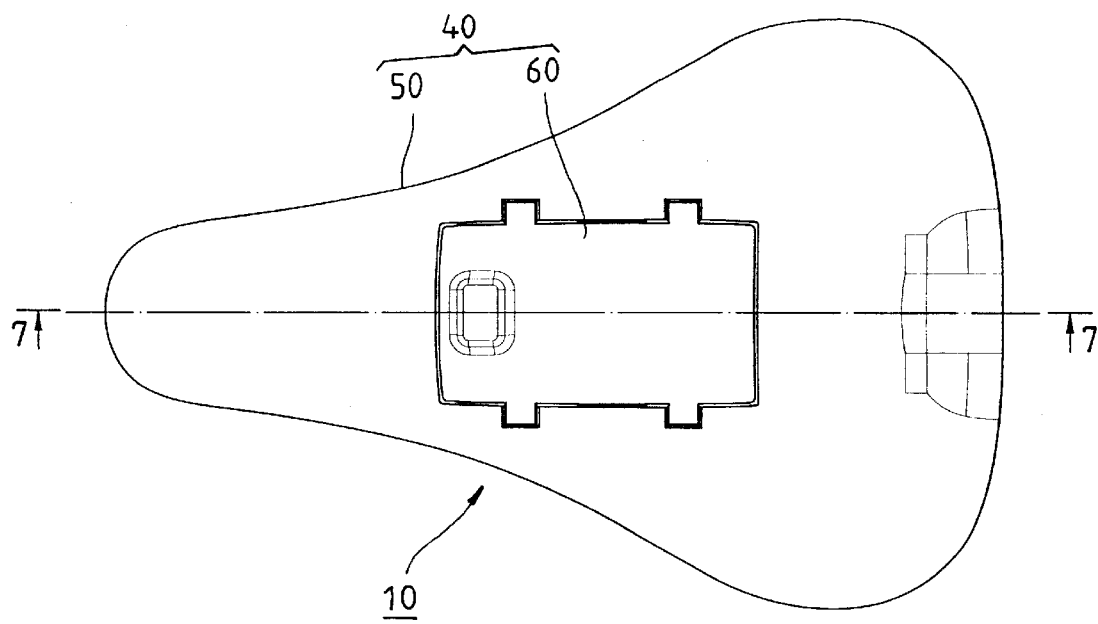
FIG. 4 is a top plain view of the tilting angle-adjustable bicycle saddle according to the preferred embodiment of the present invention.

The cap 60 is a flat cover member fitting the top open side of the top open chamber 52, having two pairs of hooks 61 symmetrically disposed at two opposite lateral sides and respectively hooked in the retaining notches 55 of the inner shell body 50. After installation of the cap 60 in the top open chamber 52 of the inner shell body 50, the inner shell 40 is assembled (see FIGS. 2, 4, and 6), and the aforesaid intermediate layer of foamed material can then bonded to the top surface of the inner shell 40.

The two screw bolts 70 are respectively inserted through the through holes 58 of the inner shell body 50 from the outside of the inner shell body 50 toward the inside thereof, and then respectively threaded into the screw holes 31 of the nuts 30 in the mounting frame 20.

During installation, the upright sleeve 21 of the mounting frame 20 is inserted into the top open chamber 52 of the inner shell body 50 and extended to the outside of the inner shell body 50 through the opening 57, for enabling the holder base 22 of the mounting frame 20 to be received in the top open chamber 52 and pivoted to the inner shell body 50 (by means of the sloping face 25 of each pivot rod 24, the pivot rods 24 of the holder base 22 can easily be coupled to the elongated coupling holes 54 in the semicircular sidewalls 53 of the top open chamber 52). Thereafter, the cap 60 is fastened to the inner shell body 50 to close the top open chamber 52, and then the aforesaid intermediate layer of foamed material is bonded to the inner shell 40, and then aforesaid fabric or leather cover is covered on the intermediate layer of foamed material. Because the structure and mounting method of the intermediate layer of foamed material and the fabric or leather cover are similar to conventional designs and not within the scope of the claims of the invention, no further detailed description in this regard is necessary.

Figure 6:
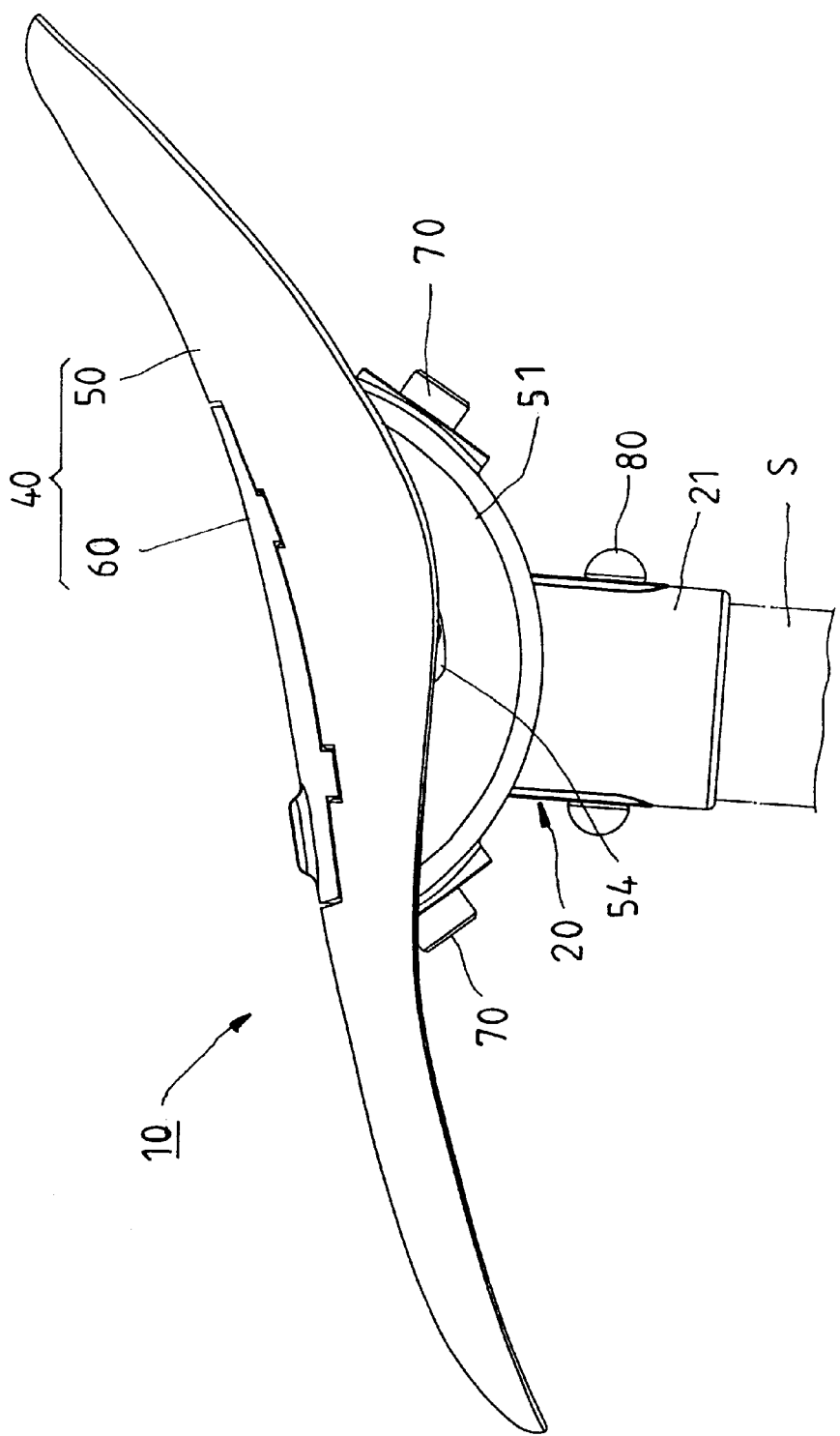
FIG. 6 is a side view of the tilting angle-adjustable bicycle saddle according to the preferred embodiment of the present invention.

The application of the tilting angle-adjustable bicycle saddle is outlined hereinafter with reference to FIGS. 6 and 7. The upright sleeve 21 of the mounting frame 20 is sleeved onto the top end of the bicycle's seat post S, and then a headed lock pin 80 is inserted through the upright sleeve 21 and the seat post S in transverse direction to lock the mounting frame 20 (the end of the lock pin 80 is hammered down to form another head, or screwed up with a nut after inserted through the upright sleeve 21 and the seat post S).

Figure 8:
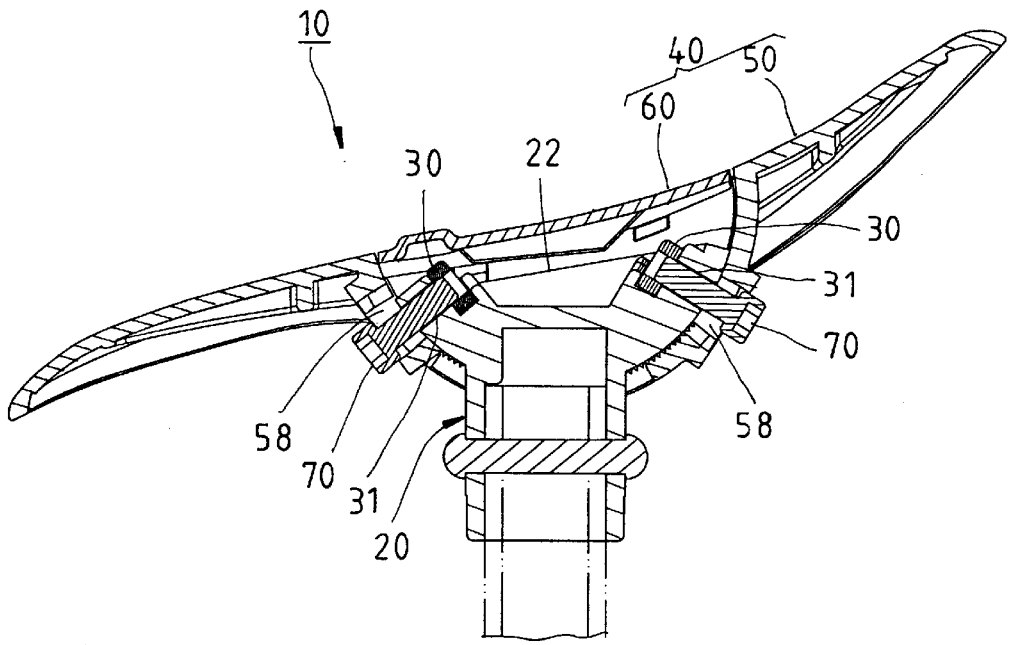
FIG. 8 is similar to FIG. 7 but showing the tilting angle of the bicycle saddle adjusted.

When adjusting the tilting angle of the saddle body (the inner shell 40) of the bicycle saddle, loosen the screw bolts 70, and then turn the saddle body forwards or backwards to the desired angle, (for example, forcing the front side of the inner shell 40 downwards to the limit as shown in FIG. 8 relative to FIG. 7, i.e., the screw bolts 70 are respectively stopped in the rear ends of the through holes 58 of the inner shell body 50), and then fasten up the screw bolts 70 again. The matching between the transverse teeth 59 at the smoothly arched bottom wall 56 of the top open chamber 52 and the transverse teeth 27 at the smoothly arched bottom wall 26 of the holder base 22 assures accurate fine adjustment, and the engagement between the transverse teeth 59 at the smoothly arched bottom wall 56 of the top open chamber 52 and the transverse teeth 27 at the smoothly arched bottom wall 26 of the holder base 22 enhances the friction resistance between the inner shell body 50 and the mounting frame 20.

What is claimed is:

1. A tilting angle-adjustable bicycle saddle comprising:
   a mounting frame having a holder base provided with two opposite sidewalls and an arched bottom wall curved downwards and connected between said sidewalls;

an inner shell having a chamber for pivotally accommodating said holder base of said mounting frame therein, said chamber having two opposite sidewalls pivotally respectively connected to said two sidewalls of said holder base of said mounting frame for enabling said inner shell to be turned relative to said mounting frame within a predetermined angle, an arched bottom wall connected between the sidewalls of said inner shell and curved downwards and substantially fitting over the arched bottom wall of said holder base of said mounting frame, a center opening in a center of the arched bottom wall of said inner shell, and two through holes in the arched bottom wall of said inner shell near two distal ends of the arched bottom wall of said inner shell; and two screw bolts respectively inserted through the through holes of the inner shell from outside of said inner shell toward inside of said inner shell and respectively screwed up with said holder base of said mounting frame directly or indirectly so as to lock said inner shell in position.

2. The tilting angle-adjustable bicycle saddle as claimed in claim 1, wherein said holder base of said mounting frame comprises two through holes in two distal ends of the arched bottom wall of said holder base; said mounting frame further comprises two nuts mounted inside said holder base on the inside, said nuts each having a screw hole respectively aimed at the through holes in the arched bottom wall of said holder base; said screw bolts are respectively inserted through the through holes in the arched bottom wall of said holder base and threaded into the screw holes of said nuts.

3. The tilting angle-adjustable bicycle saddle as claimed in claim 1, wherein said inner shell comprises an inner shell body having a relatively narrower front side, a relatively broader rear side, a protruding bottom block downwardly suspended on a middle at a bottom side thereof and defining therein said chamber, and a cap fastened to said inner shell body to close said chamber; said mounting frame further comprises an upright sleeve downwardly extended from the arched bottom wall of said holder base and inserted through the center opening of said inner shell body.

4. The tilting angle-adjustable bicycle saddle as claimed in claim 3, wherein the sidewalls of said chamber of said inner shell each have a top retaining notch; said cap comprises two hooks symmetrically disposed at two sides and respectively hooked in the retaining notches of said inner shell.

5. The tilting angle-adjustable bicycle saddle as claimed in claim 1, wherein the sidewalls of said chamber of said inner shell each have a coupling hole; said holder base of said mounting frame comprises two pivot rods respectively perpendicularly extended from the sidewalls thereof and respectively coupled to the coupling holes in the sidewalls of said chamber of said inner shell.

6. The tilting angle-adjustable bicycle saddle as claimed in claim 1, wherein the arched bottom wall of said holder base of said mounting frame has a plurality of transverse teeth formed in an outer surface thereof; the arched bottom wall of said chamber of said inner shell has a plurality of transverse teeth formed in a top surface thereof for engagement with the transverse teeth of said holder base of said mounting frame.

* * * * *